United States Patent [19]
Tamura et al.

[11] Patent Number: 5,174,937
[45] Date of Patent: Dec. 29, 1992

[54] METHOD FOR MOLDING OF SUBSTRATE FOR INFORMATION RECORDING MEDIUM AND METHOD FOR PREPARING SUBSTRATE FOR INFORMATION RECORDING MEDIUM

[75] Inventors: Tomoyuki Tamura, Yokohama; Mizuho Hiraoka, Kawasaki; Hiroyuki Imataki, Kawasaki; Tetsuya Sato, Kawasaki, all of Japan

[73] Assignee: Canon Kabushiki Kaisha, Tokyo, Japan

[21] Appl. No.: 622,151

[22] Filed: Dec. 3, 1990

Related U.S. Application Data

[63] Continuation of Ser. No. 238,500, Aug. 31, 1988, abandoned.

[30] Foreign Application Priority Data

| Sep. 5, 1987 | [JP] | Japan | 62-222816 |
| Sep. 7, 1987 | [JP] | Japan | 62-222020 |
| Sep. 7, 1987 | [JP] | Japan | 62-222021 |
| Dec. 21, 1987 | [JP] | Japan | 62-324322 |
| Dec. 28, 1987 | [JP] | Japan | 62-329677 |
| Dec. 28, 1987 | [JP] | Japan | 62-329678 |

[51] Int. Cl.⁵ .............................. B29C 33/30
[52] U.S. Cl. .................... 264/106; 264/219; 264/297.2; 249/103; 425/175; 425/810
[58] Field of Search .............. 249/102, 103, 104, 120, 249/163; 264/106, 219, 328.1, 297.2, 2.5, 2.7; 425/810, 175, 179; 29/458, 460; 156/242, 246, 245

[56] References Cited

U.S. PATENT DOCUMENTS

| 3,536,290 | 10/1970 | Terry | 249/103 |
| 4,295,628 | 10/1981 | Kupf et al. | 249/103 |
| 4,435,343 | 3/1984 | Ando et al. | 264/22 |
| 4,670,077 | 6/1987 | Peeters | 264/259 |
| 4,783,041 | 11/1988 | Sakaida et al. | 249/103 |
| 4,828,769 | 5/1989 | Maus et al. | 264/328.7 |

FOREIGN PATENT DOCUMENTS 3040955 5/1982 Fed. Rep. of Germany .
2040787A 3/1980 United Kingdom .

Primary Examiner—Jill L. Heitbrink
Attorney, Agent, or Firm—Fitzpatrick, Cella, Harper & Scinto

[57] ABSTRACT

A method for preparing a substrate for an information recording medium, which comprises injecting a liquid resin into a mold for cast molding of a substrate for information recording medium having a plurality of units of mold for cast molding having an uneven preformat pattern on the surface arranged therein and solidifying the resin, and a mold for molding of the substrate.

24 Claims, 8 Drawing Sheets

METHOD FOR MOLDING OF SUBSTRATE FOR INFORMATION RECORDING MEDIUM AND METHOD FOR PREPARING SUBSTRATE FOR INFORMATION RECORDING MEDIUM

This application is a continuation of application Ser. No. 238,500 filed Aug. 31, 1988, now abandoned.

BACKGROUND OF THE INVENTION

1. Field of the Invention

This invention relates to a mold for molding when preparing a substrate for information recording medium according to the cast molding method and to a method for preparation thereof.

2. Related Background Art

In the prior art, a substrate for information recording medium has an uneven pattern such as grooves for tracking, pits for information, etc. on the information recording surface thereof. As the method for forming this uneven pattern on the substrate, there have been known (1) a method in which a track groove of the stamper type is transferred by the injection method or the hot press method when the substrate comprises a thermoplastic resin, or (2) the method according to the so-called 2P method, in which a photocurable resin composition is applied on a transparent resin plate comprising a thermosetting resin or a thermoplastic resin, then an energy source such as UV-rays are imparted from the side of the transparent resin plate with the stamper mold adhered thereon to cure the above photocurable resin composition, and the replica of the stamper mold is transferred onto the transparent resin plate.

However, the thermoplastic resin substrate obtained according to the injection method or the hot press method of the first method has the problem that warping or optical anisotropy of the substrate after molding may be caused due to residual stress or orientation of molecules due to thermal history during molding.

On the other hand, the substrate obtained according to the 2P method of the second method will frequently generate the problem of deterioration of recording characteristics, because the polymerization initiator or monomer to be used in photocuring is liable to remain within the resin after photocuring, whereby they have influences on the optical recording layer of the recording medium.

As the method for preparing a substrate for information recording medium is free from such problems, there has been known (3) the method in which during cast molding of a prepolymer containing a monomer of the resin or a solvent, cast molding is effected by use of a mold for casting having track grooves formed previously on one side or both sides thereof. The substrate obtained according to this method has substantially no pressure applied during molding as compared with the methods of (1) and (2). Also, thermoplastic resins, thermosetting resins and photocurable resins can be utilized as the resin for molding, and therefore a resin having no deleterious influence on the recording layer can be chosen.

In the third cast molding method (3), as the mold having an uneven pattern corresponding to the uneven preformat such as grooves for tracking, pits for information, etc., there has been known glass plates subjected to patterning of such unevennesses by photolithographic steps, or to patterning by laser cut, or glass plates, metal plates having unevenness formed thereon by direct cuts with a diamond needle having a sharp end, etc.

However, as a problem in cast molding, there may be low productivity because of very long treatment time at one time during production of the substrate. Accordingly, for the purpose of improving productivity, as a mold to be used in the above cast molding, a mold for giving a plural number of units has been demanded. However, as described above, since minute working is required to form unevenness on the mold for casting, in the case of manufacturing a mold for producing a plural number of units, the production cost will become disadvantageously high. Also, when failures such as defects, etc. occur in one pattern of a plural number of pattern surfaces, there is the problem that the mold itself is no longer usable.

SUMMARY OF THE INVENTION

The present invention has been accomplished for improving such drawbacks of the cast molding of the prior art, and its object is to provide a method for preparing substrates for information recording medium with good productivity, and having an uneven preformat formed on the surface, which is optically isotropic without warping.

Another object of the present invention is to provide a method for preparing substrates for an information recording medium, which can obtain substrates for information recording medium with good productivity, and having an uneven preformat formed on the surface and is optically isotropic without warping. And even if defects may be generated in one unit, only that unit need be disregarded.

Still another object of the present invention is to provide a method for a preparing substrates for information recording medium having flat and smooth surfaces, which are optically isotropic without warping, with good mold releasability and improved durability of the mold for casting.

Further, it is also an object of the present invention to provide a mold for molding of the substrates for information recording medium, which is capable of preparing substrates for an information recording medium which are optically isotropic without warping and have uneven preformats formed on the surface and also have durability.

In accordance with an aspect of the present invention, there is provided a method for preparing a substrate for an information recording medium which comprises injecting a liquid resin into a mold for cast molding of a substrate for an information recording medium having a plurality of units of mold for cast molding an uneven preformat pattern on the surface arranged therein and solidifying the resin.

In accordance with another aspect of the present invention, there is provided a mold for molding a substrate for an information recording medium which comprises a plurality of units of mold for cast molding having an uneven preformat pattern on the surface fixed with a fixing member.

Thus, according to the mold for molding a substrate for an information recording medium and the method for preparing a substrate for an information recording medium of the present invention, the patterns are formed on the respective units, and the units are independent of each other, whereby a mold formed of a plurality of units can be prepared at low cost. Also, even when defects may be formed on one pattern, only the defected unit needs to be replaced and therefore the production cost of the information recording medium can be remarkably reduced.

DETAILED DESCRIPTION OF THE PREFERRED EMBODIMENT

In the following, the present invention is to be described in detail by use of the drawings.

Figure 1:
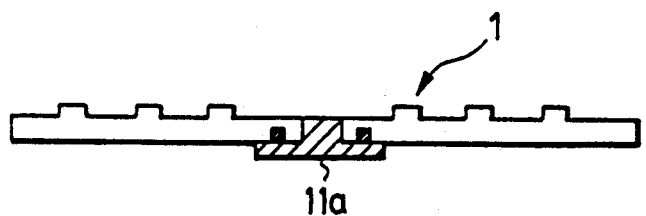
FIGS. 1 to 4, and FIGS. 10A and 10B are schematic cross-sectional views showing the embodiments of the molds for molding a substrate for information recording medium according to the present invention.
Figure 3:
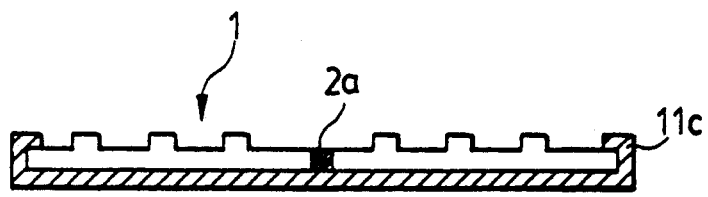

The present invention is a method for preparing a substrate for information recording medium according to the cast molding method by using, for example, a mold for casting formed of a plural number of units, having a cross-sectional shape opposite to the uneven shapes such as grooves for tracking, and pits for information of an optical recording medium. The mold for casting is formed of a plural number of units of the present invention and has a structure in which a plural number of units 1 having one or a plurality of uneven preformat patterns are arranged and fixed with a fixing member 11a as shown in FIG. 1, and it is also desirable that each unit 1 may be freely detachable and exchangeable. As the fixing method to be employed here, there is the method in which the units are fixed by screwing through a bonding member 11 as shown in FIG. 1, or the method in which a fixing member 11 is arranged around the units to fix them as shown in FIG. 3. However, it is desirable in these methods that there should be a void, or space, of generally 10 mm or less, preferably in the range of 2 to 5 mm, between the units, for thermal expansion by the reaction heat, etc. during working of the resin for casting, precision of registration and further as the cutting portion of the molded product. When the resin for casting is penetrated into the void portions between the units to be solidified therein, a substrate having projections is prepared, but absence of such projection is preferable for continuous production of the substrate for an information recording medium, and further preferable with respect to mold releasability of the mass of the cured substrates for an information recording medium from the mold for molding.

Figure 4:
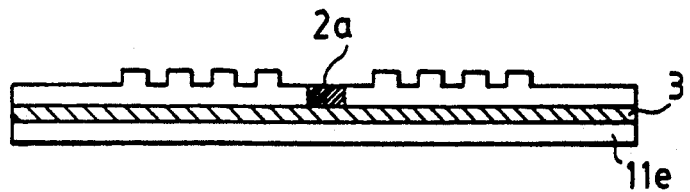

Accordingly, when the void portions between the units are embeded with a fixing member 11 as shown in FIG. 1, it is preferable that the resin for casting should be sealed from leaking through the fixing member, or alternatively through the sealing material 2 when a member for backing is used as the fixing member as shown in FIG. 4. The sealing material 2 (including the fixing member which acts as the sealing member) should be preferably one which is not corroded by the resin for casting, and further has a thermal expansion coefficient approximate to the material of the unit or can absorb the thermal expansion coefficient of the unit.

As such materials, there can be employed low melting glasses, low melting metals and resins, depending on the material of the units and the material of the resin for casting.

As the low melting glass, there may be employed those having a difference in thermal expansion coefficient from the unit of $30 \times 10^{-7}$ mm/(mm °C.) or less, preferably $20 \times 10^{-7}$ mm/(mm °C.). For example, PbO-SiO$_2$-ZnO system, PbO-Al$_2$O$_3$-SiO$_2$-ZnO system, vanadium phosphate system glasses may be employed.

As the low melting metal, metals having a melting point of 300° C. or lower may be employed, for example, eutectic solder, Pb, In, Sn and alloys thereof, but it is preferable to use an eutectic solder, In, etc. in view of releasability from the resin to be used for casting and modulus of elasticity.

As the resin, either one of thermoplastic resin or thermosetting resin can be used, provided that it has solvent resistance not corroded by the resin for casting. For example, there can be used as the thermoplastic resin vinyl resin, styrene resin, acrylic resin, polycarbonate resin, acetate resin, polyester resin, imide resin, fluorine type resin, olefinic resin, and as the thermosetting resin, phenol resin, melamine resin, epoxy resin, urea resin, polyester resin, etc.

Further, among these, resins having a Young's modulus of 2 to 300 kg/cm$^2$, particularly 2 to 80 kg/cm$^2$, may be preferably employed. That is, by making the Young's modulus 2 kg/cm$^2$ or higher, no deformation will occur even under a minute pressure applied during injection of the liquid resin for casting, while various stresses applied during molding can be absorbed by making the Young's modulus 300 kg/cm$^2$ or less.

Further, in view of mold releasability from the resin for cast molding, mold releasability can be improved by use of a sealing material having a contact angle, as measured with water, of 100° or higher, and as such resins, silicone resins or fluorine type resins may preferably employed. In case of a material other than such resins, the mold releasability can be improved by applying the mold release treatment to the members.

As the method for applying the mold release treatment to the resin, it can be practiced by the method of coating or vapor depositing a mold release agent thereon.

As the mold release agent, in the case of coating, for example, fluorine type resins, olefinic resin, silicone resins, etc. may be employed. Also, a plasma polymerized film of the monomers for these resins may be appropriately employed. It is also possible to use an adhesive as the resin for the sealing material, such as acrylic adhesives, urethane type, polysulfide type, butyl type, styrene-butadiene rubber type, polyvinyl chloride type, chloroprene rubber type, chlorosulfonated polyethylene type, and ethylene-propylene rubber type adhesives, etc. Mixtures of these may be also available.

Of these adhesives, as the adhesive particularly excellent in heat resistance and solvent resistance, epoxyacrylate type adhesives or adhesives containing epoxyacrylate may be particularly preferred.

Figure 2:
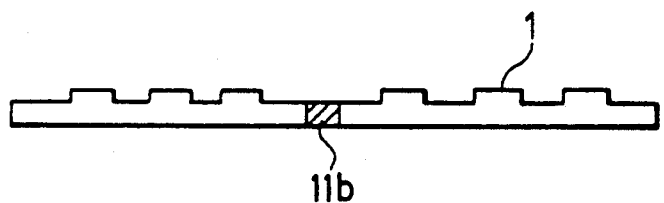

Whereas, among the above-listed members, low melting glass, low melting metal and adhesives can also function as both the sealing material and the fixing member. For example, a mold for cast molding of the present invention can be obtained without use of another fixing member such as the member for backing as shown in FIG. 2.

When the mold for cast molding formed of a plural number of units of the present invention is prepared by bonding after correction of the relative positions of the respective units, the mass of the substrates for information recording medium obtained with this mold can be applied with, for example, the printing steps of a recording layer without cutting the mass into individual substrates for a information recording medium, whereby productivity can be further improved. As the method for preparing such a mold, for example, the units can be adhered by use of the member for backing 4 as shown in FIG. 4 as the fixing member 11e and a UV-ray curable type adhesive as the adhesive 3. More specifically, when an adhesive of, for example, the thermosetting type is used as the adhesive to be used for this fixing, there ensues the problem of misregister by the stress due to shrinkage of the cured resin. Accordingly, as the characteristic of such adhesive, it is required to fix quickly without misregister after registration. As a kind of such adhesive, UV-ray curable type adhesives can be used. When the UV-ray curable type adhesive is in an uncured state, a plural number of units for molding (hereinafter written as unit) having unevenness such as grooves for tracking, pits for information on the surface, are arranged in the member for backing with registration by correcting the positions between said units before curing of the above UV-ray curable type adhesive to fix the arrangement. Subsequently, by filling the gaps between the units with a sealing material, a more preferable mold for cast molding according to the present invention can be obtained.

As another method, registration between the respective units is effected by use of an implement etc., the gaps between the units are filled and fixed with a low melting glass, low melting metal or adhesive, followed by removal of the implement, to give the product as such or after adhesion of a member for backing.

Figure 10A:
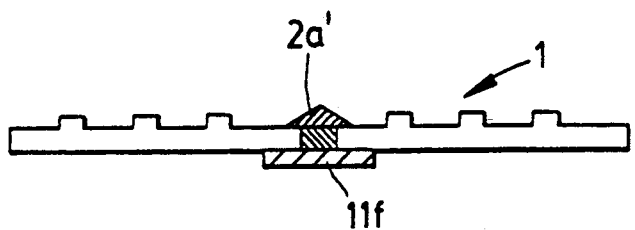
Figure 10B:
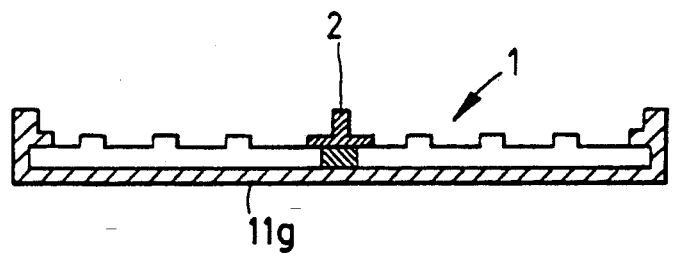

Further, when the fixing member or the sealing material for sealing the voids between the units is made, the portion protruding from the surfaces of the respective units as shown in FIG. 10 in the present invention, the portions corresponding to the above fixed portions of the mass of the substrates for information recording medium prepared become concave portions, and by forming a thickness not thicker than the substrate, flash generated between the respective units in the substrate formed of a plural number of units can be prevented, whereby inconveniences due to the flash in the preparation steps for a recording medium such as the step of forming a recording layer can be avoided. Also, since the concave portion on the substrate formed by the protruded portion of the mold for cast molding can be utilized for conveniently marking in the respective steps for preparation of recording medium, productivity in the preparation steps for a recording medium can be improved.

In the present invention, the material for the unit is not particularly limited, but conventional materials may be employed, including, for example, glass plates, ceramics, metals, etc., and the substrate portion and the pattern portion of the unit may be either the same or different material.

Whereas, in a unit having a metal film subjected to patterning formed on a glass plate, the metal film is liable to be peeled off if the temperature during sealing or fixing of the gaps between the units is too high. For this reason, it is desirable that the bonding temperature in bonding the units with a low melting glass is 500° C. or lower. When such units are sealed or fixed with a low melting metal, in order to improve adhesion between the glass plate of the unit and the low melting metal, it is preferable to attach a metal film by sputtering, vapor deposition, etc. on the bonding surface of the unit and the low melting metal, namely the side surface of the unit, or the side surface and the back surface of the unit. For such metal film, chromium, titanium, etc. may be employed.

On the other hand, when a fixing member not functioning as the sealing material, for example, a member for backing is employed, its material is not particularly limited, but a broad scope of materials can be employed, preferably the same material as the unit or the material having a thermal expansion coefficient approximate to the unit such as the low melting metal or the low melting glass as described above. For example, a glass plate, ceramics or metal, etc. with good thickness precision and flatness can be used.

The number of uneven preformat patterns formed on these units may be determined depending on the yield, cost, etc. of the substrate for an information recording medium prepared by forming grooves for tracking, pits for information, etc. For example, the mold for casting in the case of preparing a substrate for an optical card is capable of patterning of the two planes by means of a 6-inch laser exposure machine, and therefore the two planes may be used as one unit and said unit can be bonded in plural number, whereby a mold for casting with a number of units multiplied by 2 can be prepared.

Also, in the present invention, the number of units to be fixed may be any of 2 or more. For example, 9 or 12 units can be fixed, or a greater number of units can be fixed.

By use of the mold for casting prepared as described above, a liquid transparent resin can be injected into the mold for casting in a conventional casting method to be solidified, followed by demolding, to give a substrate for an information recording medium.

The liquid resin to be injected into the mold for casing in the present invention may be a transparent uncured thermosetting resin, a photocurable resin or unpolymerized thermoplastic resin. For example, the thermosetting resin may include phenol resin, epoxy resin, polyester resin, etc., while the thermoplastic resin may include vinyl resin, styrene resin, acrylic resin, polycarbonate resin, acetate resin, polyester resin, etc.

As described above, by the mold for molding the substrate for an information recording medium and the method for preparing the substrate for an information recording medium according to the present invention, the units having uneven patterns on the surface corresponding to the uneven preformat pattern on the substrate for an information recording medium are mutually bonded to each other to give a mold for casting. The substrates for an information recording medium in proportion to the number of units bonded by a one pass molding process can be prepared, and also the units will receive no damage by mechanical shock received during molding working owing to bonding mutually between the units. Further, since the member for bonding the units to each other has excellent releasability relative to the resin to be cast molded, demolding after cast molding can be done with ease. Thus, the present invention can provide a mold for molding and a method for preparation thereof, which can prepare substrates for an information recording medium having a flat and smooth surface, which is optically isotropic without warping, and with improved durability of the mold for casting.

EXAMPLE 1

A mold for molding according to the present invention is to be described by referring to FIG. 1.

1 is a unit with a size of 12.5 cm × 12.5 cm comprising a nickel plate having a groove for tracking and pits for information formed by laser cut on the surface. With this as one unit, a plural number of units were prepared. Next, these units 1 were bonded with a bonding member 11a. The bonding member 11 is made of aluminum die cast and fixed with a bolt. Also, this fixing member is a member subjected sufficiently to sealing so that no liquid resin during casting will be leaked out, and each unit is exchangeable by removing the bolt.

By use of the mold for cast molding obtained as described above, a resin with the following composition was injected and polymerization was carried out at 130° C. for 6 hours to prepare a mass of the substrates for information recording medium.

| [Formulated composition] | |
|---|---|
| Methyl methacrylate | 70 parts by weight |
| tert-Butyl methacrylate | 25 parts by weight |
| Polyethylene glycol dimethacrylate (MW 620) | 5 parts by weight |

When the mass of the substrates for information recording medium was cut and its birefringence was examined, phase contrast within a card substrate of 54 mm in length, 86 mm in width and 0.4 mm in thickness was found to be 0.1 to 3 nm, with no warping of the substrate being observed.

EXAMPLE 2

The preparation process for the mold for molding according to the present invention is to be described consecutively by referring to FIG. 5.

First, 1 is a unit with a size of 12.5 cm × 12.5 cm comprising a nickel plate having a groove for tracking with a width of 3 μm and a pitch of 12 μm and an uneven preformat pattern which will become the pit for information formed on the surface, and with this as one unit, a plural number of units are prepared.

Next, the above units were bonded to each other by use of a polyurethane type adhesive as the fixing member 11b.

Further, for achieving a positional precision of each unit 1 and a rigidity of the mold, the member for backing 4 may be adhered on the back surface of each unit 1 through the same adhesive 3 as the adhesive 2.

Next, the mold obtained as described above and another glass plate 5 subjected on the surface to optical polishing are arranged as opposed to each other, and a spacer 6 is provided therearound to assemble a cell.

Into said cell is injected as the liquid resin 7 an uncured epoxy resin having the following formulated composition, followed by curing at 100° C. for 10 hours.

| [Formulated composition] | |
|---|---|
| Bisphenol A type epoxy resin | 100 parts by weight |
| Methylhexahyrophthalic anhydride | 88 parts by weight |
| 2-Ethyl-4-methylimidazole | 0.5 part by weight |
| 2,6-Di-tert-butyl-p-cresol | 1.0 part by weight |

Figure 11A:
Figure 11B:
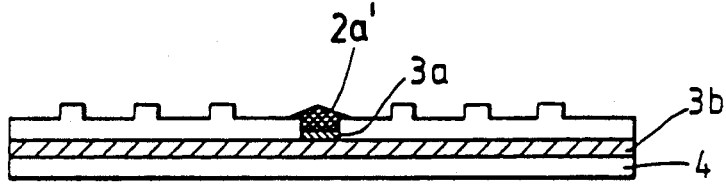
Figure 11C:
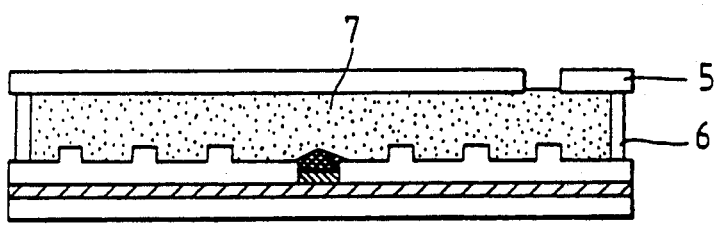
Figure 11D:
Figure 11E:
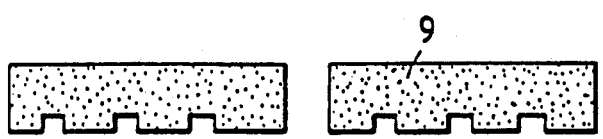

Next, after demolded from the mold as shown in FIG. 11D, the substrate formed of a plural number of unit surfaces was cut into predetermined sizes to obtain a substrate 9 for information recording medium (see FIG. 11C).

When the birefringence of the substrate for information recording medium obtained was examined, the phase contrast within a card substrate of 54 mm in length, 86 mm in width and 0.4 mm in thickness was found to be 0.1 to 5 nm, with no warping of the substrate being observed.

EXAMPLE 3

FIG. 3 is a sectional view showing the structure of the mold for cast molding to be used in Example 3 of the present invention.

1 is a unit prepared according to the same method as prepared in Examples 1, 2, and 11C shows a frame as the fixing member. Also, for this member, either a metal or a heat-resistant resin can be used. Further, by providing a thickness as the spacer at the outer circumference of the frame, the bonding member and the spacer can be integrated. By use of the mold for cast molding obtained as described above, a substrate was prepared according to the same method as in Example 1.

In the case of this Example 3, bonding of the respective units and the spacer can be integrated. When the birefringence of the substrate for information recording medium was examined, the phase contrast within a card substrate of 54 mm in length, 86 mm in width and 0.4 mm in thickness was found to be 0.1 to 5 nm, with no warping of the substrate being observed.

EXAMPLE 4

Example 4 is described by referring to FIG. 5. 1 is a unit comprising a glass plate prepared similarly as in Example 2, and a plural number of the units were prepared.

Next, said units were adhered to each other by use of an acrylic rubber type adhesive controlled to a Young's modulus of 35 kg/cm² during curing of the resin for cast molding at the fixing member 11 to be bonded.

Also, in order to obtain a positional precision of each unit and a rigidness as the mold, it is desirable to adhere the member for backing 4 through the same adhesive 3 as the adhesive 2 on the back of each unit 1. As the member for backing 4, a glass plate having a sufficient thickness precision and flatness was used.

Next, with the mold obtained and another glass plate 5 subjected on the surface to optical polishing arranged as opposed to each other through a spacer, a cell is assembled.

Into said cell is injected a liquid epoxy resin having the following formulated composition as the liquid resin, followed by curing at 100° C. for 10 hours.

| [Formulated composition] | |
|---|---|
| Bisphenol A type epoxy resin | 100 parts by weight |
| Methylhexahydrophthalic anhydride | 88 parts by weight |
| 2-Ethyl-4-methylimidazole | 0.5 part by weight |
| 2,6-Di-tertiary-butyl-p-cresol | 1.0 part by weight |

Next, after demolded from the mold, the substrate formed of a plural number of unit surfaces was cut into predetermined sizes to obtain a substrate for information recording medium.

When the birefringence of the substrate for information recording medium obtained was examined, the phase contrast within a card substrate of 54 mm in length, 86 mm in width and 0.4 mm in thickness was found to be 0.1 to 5 nm, with no warping of the substrate being observed.

EXAMPLE 5

Into the cell assembled similarly as in Example 4, a resin having the following composition is injected and polymerization is carried out at 130° C. for 6 hours, and following otherwise the same procedure as in Example 4, a substrate for an information recording medium was obtained.

When the birefringence of the substrate for information recording medium obtained was examined, the phase contrast within a card substrate of 54 mm in length, 86 mm in width and 0.4 mm in thickness was found to be 0.1 to 3 nm, with no warping of the substrate being observed.

| [Formulated composition] | |
|---|---|
| Methyl methacrylate | 70 parts by weight |
| Tertiary-butyl methacrylate | 25 parts by weight |
| Polyethylene glycol dimethacrylate (MW 620) | 5 parts by weight |

COMPARATIVE EXAMPLE 1

As Comparative example 1, a substrate for cast molding was prepared by use of an epoxy type resin of the bisphenol A type in general as the adhesive, and a substrate was prepared according to the same steps as in Example 4.

When durability of the mold for casting of Example 4 and Comparative example 1 was evaluated, no particular inconvenience occurred even when cast molding was repeated for 100 times, but a part of the units within the mold was peeled off after about 50-th molding, whereby there ensued a problem in thickness precision of the substrate.

EXAMPLE 6

FIGS. 6A to 6E illustrate the process showing an example of the method for preparation of the information recording medium of the present invention. All of the Figures show the cross-sections of the substrate.

The preparation process is now described consecutively by referring to the drawings.

Figure 6A:

First, in FIG. 6A, in a groove of high precision, a plural number of units 1 having chromium film formed on a glass plate according to the photolithographic steps were prepared to provide each single unit.

Figure 6B:
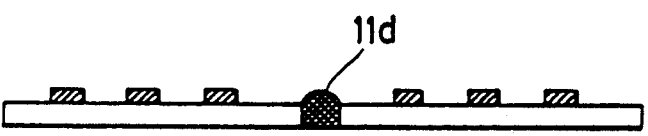

Next, after correction of the position of the unit, the position of the unit is quickly fixed by use of an implement, and a low melting glass of the PbO-SiO$_2$-ZnO system is filled as the bonding member in the gaps of about 3 mm in width between the units and heated to 400° C. to melt the low melting glass, thereby effecting fixing and sealing between the units (FIG. 6B).

In this case, when a blue glass plate is used for the unit, since it has a thermal expansion ratio of about 90 to 100×10$^{-7}$ mm/(mm°C.) the thermal expansion ratio of the low melting glass is made 100 to 110×10$^{-7}$ mm/(mm°C.). The low melting glass had a Tg of 320° C. and the bonding temperature is sufficiently 400° C.

Figure 6C:
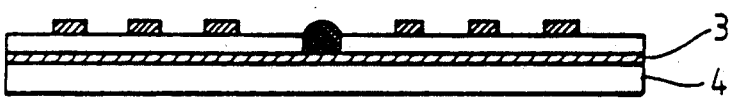

Next, the unit is removed from the implement and a member for backing is adhered by use of Cemedine 1565 (produced by Cemedine K.K.) as the adhesive (FIG. 6C).

Figure 6D:
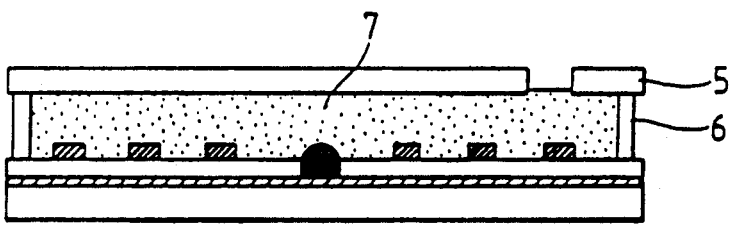

Next, as shown in FIG. 6D, the mold obtained as described above another glass plate 5 subjected on the surface to optical polishing is arranged so as to be opposite to each other and a spacer 6 is provided therearound to assemble a cell. Into said cell was injected a resin having the following formulated composition as the liquid resin 7, and polymerization is carried out at 120° C. for 10 hours.

| [Formulated composition] | |
|---|---|
| Methyl methacrylate | 70 parts by weight |
| Tertiary-butyl methacrylate | 25 parts by weight |
| Polyethylene glycol dimethacrylate (MW 620) | 5 parts by weight |

Figure 6E:

Next, as shown in FIG. 6E, an information substrate 8 for information recording medium formed of a plural number of units is obtained by demolding from the mold.

When the birefringence of the substrate obtained was examined, the phase contrast was found to be sufficiently small as 0.1 to 0.5 nm within a card substrate of 54 mm in length, 86 mm in width and 0.4 mm in thickness, and there was no warping of the substrate observed.

EXAMPLE 7

FIGS. 7A to 7F illustrate the process showing an example of the method for preparation of the information recording medium of the present invention. All of the Figures show the cross-sections of the substrate.

The preparation process is now described consecutively by referring to the drawings.

Figure 7A:

First, in FIG. 7A, in a groove of high precision, a plural number of units 1 having chromium film formed on a glass plate according to the photolithographic steps is prepared to provide each one unit.

Figure 7B:

As shown in FIG. 7B, the above unit 1 is set in a vacuum chamber and metal film 21 is adhered by spattering on the surface which a Chromium film is not formed. The spattering was conducted by introducing Ar gas of 20 m Torr and at a power of 1 kW with a R.F. magnetron. Since Chromium is spattered evenly around the unit by spattering, a Chromium film is adhered simultaneously on the side and back surface.

Figure 7C:
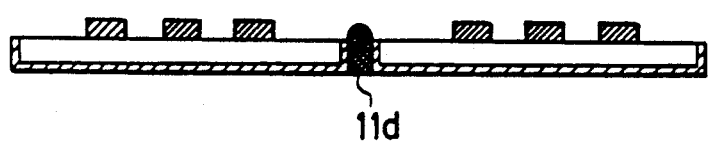

Next, after correction of the position of the unit, the position of the unit is quickly fixed by use of an implement, and the gaps between the units with a width of about 3 mm are bonded with a low melting metal 11d. For the low melting metal, an eutectic solder is used, and the eutectic solder is heated to 200° C. to be melted without void into the gaps between the units, thereby effecting fixing and sealing between the units (FIG. 7C).

Figure 7D:
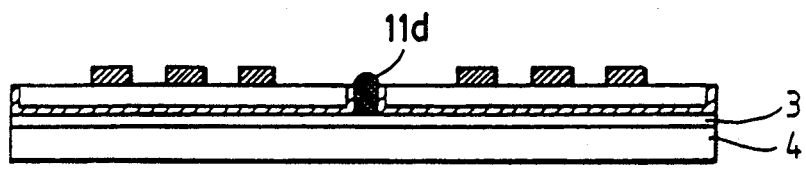

Next, the unit is removed from the implement and a member for backing is adhered by use of Cemedine 1565 (produced by Cemedine K.K.) as the adhesive (FIG. 7D).

Figure 7E:
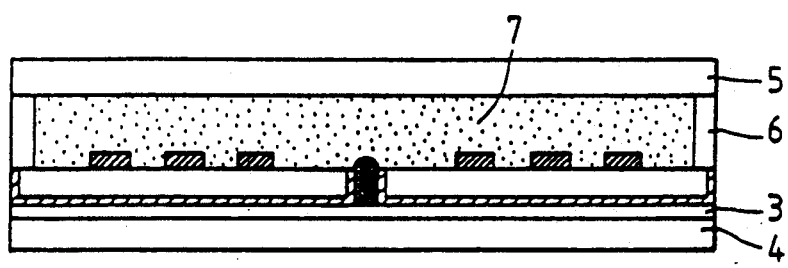

Next, as shown in FIG. 7E, the mold obtained as described above has another glass plate 5 subjected on the surface for optical polishing and arranged so as to be opposite to each other and a spacer 6 is provided therearound to assemble a cell. Into said cell is injected a resin having the following formulated composition as the liquid resin 7, and polymerization is carried out at 120° C. for 10 hours.

[Formulated composition]

| | |
|---|---|
| Methyl methacrylate | 70 parts by weight |
| Tertiary-butyl methacrylate | 25 parts by weight |
| Polyethylene glycol dimethacrylate (MW 620) | 5 parts by weight |

Figure 7F:
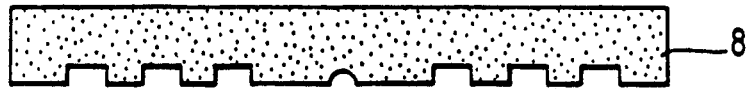

Next, as shown in FIG. 7F, a substrate 9 for an information recording medium formed of a plural number of units is obtained by demolding from the mold.

When the birefringence of the substrate obtained was examined, the phase contrast within a card substrate of 54 mm in length, 86 mm in width and 0.4 mm in thickness was sufficiently small as 0.1 to 0.5 nm, and also no warping of the substrate was observed.

EXAMPLE 8

By use of FIGS. 5A to 5F, an example of the method for preparation of the substrate for an information recording medium is shown. All of the Figures show the cross-sections of the substrate.

The preparation process is now described consecutively by referring to the drawings.

Figure 5A:
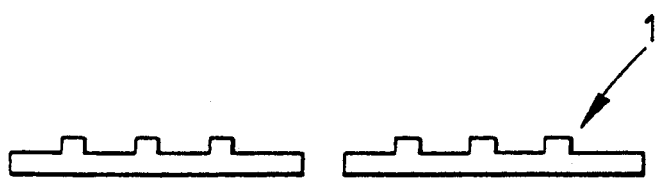
FIGS. 5A-5F, 6A-6E, 7A-7F, 8A-8F, 9A-9E, and 11A-11E are schematic cross-sectional views showing the embodiments of the methods for preparing substrates for information recording medium according to the present invention.

First, in FIG. 5A, a plural number of units 1 comprising a glass plate having a groove of high precision formed thereon are prepared to provide them respectively as one unit.

Figure 5B:
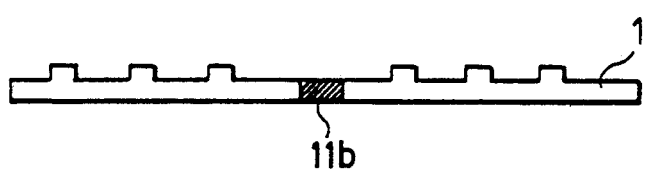

Next, in FIG. 5B, the above units 1 are bonded together with a fixing member 11b. In this Example, a silicone adhesive is used for the fixing member, but fluorine resin type adhesives are also available as other Examples. Also, for obtaining the positional precision as each unit 1 and the rigidity of the mold, it is desirable to adhere a member for backing through an adhesive 3 such as epoxy type, silicone type, polyester type and acrylic type on the back of each unit 1. As the member for backing 4, a glass plate or metal with good thickness precision and flatness was used.

Figure 5C:
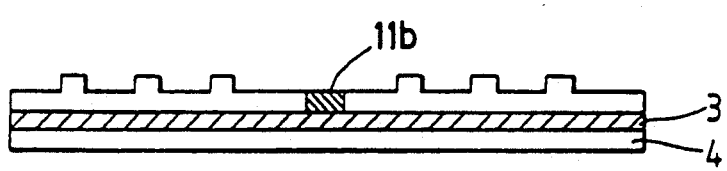
Figure 5D:
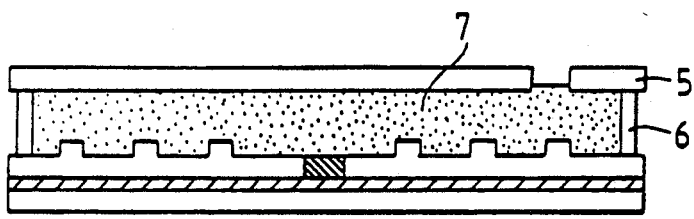

Next, as shown in FIG. 5C, the mold obtained as described above and another glass plate 5 subjected on the surface to optical polishing are arranged opposite to each other, and a spacer 6 is provided therearound to assemble a cell.

Into the cell is injected a liquid epoxy resin having the following formulated composition as the liquid resin 7, followed by curing at 100° C. for 10 hours.

[Formulated composition]

| | |
|---|---|
| Bisphenol A type epoxy resin | 100 parts by weight |
| Methylhexahydrophthalic anhydride | 88 parts by weight |
| 2-Ethyl-4-methylimidazole | 0.5 part by weight |
| 2,6-Di-tertiary-butyl-p-cresol | 1.0 part by weight |

Figure 5E:
Figure 5F:
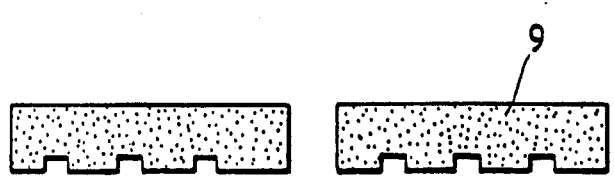

Next, after being demolded from the mold as shown in FIG. 5E, the substrate formed of a plural number of unit surfaces is cut into predetermined sizes to obtain a substrate 9 for an information recording medium (see FIG. 5F).

When the birefringence of the substrate obtained was examined, the phase contrast within a card substrate of 54 mm in length, 86 mm in width and 0.4 mm in thickness was 0.1 to 5 nm, without striae, etc. due to poor mold releasability of the substrate, and no warp was also observed.

EXAMPLE 9

A plural number of units comprising a nickel plate having a groove for tracking and pits for information formed by laser cut on the surface are prepared, and these units are bonded with a fixing member. The fixing member is made of, for example, a silicone resin, Teflon resin, etc., each of which has a contact angle of 100° or lower, and which is a member enabling sufficient sealing so that no liquid resin will be leaked out during cast molding, and also has a detachable structure.

By use of the mold for molding obtained as described above, a cell is assembled similarly as described in Example 1, and an acrylic resin having the following formulated composition is injected thereinto as the liquid resin, followed by polymerization at 130° C. for 6 hours.

[Formulated composition]

| | |
|---|---|
| Methyl methacrylate | 70 parts by weight |
| Tertiary-butyl methacrylate | 25 parts by weight |
| Polyethylene glycol dimethacrylate (MW 620) | 5 parts by weight |

Next, after demolding from the mold, the substrate formed of a plural number of units is cut into predetermined sizes to obtain a substrate for an information recording medium.

When the birefringence of the information recording medium was examined similarly as in Example 1, the phase contrast within a card substrate was found to be 0.1 to 3 nm, without striae, etc. due to poor mold releasability of the substrate, and no warp was observed.

The following Table 1 shows evaluation when various members for bonding the units are employed.

From the Table, it can be seen that the evaluation is 90 for adhesives of the fluorine type and the silicone type with a contact angle with water of 100° or more, but the evaluation for the adhesives with the contact angle of less than 100° of the ethylene type et seq is 65 or less to give poor yield.

TABLE 1

| Bonding member | Contact angle (water) | Evaluation |
|---|---|---|
| Fluorine type | 120° | 90 |
| Silicone type | 110° | 90 |
| Ethylene type | 98° | 65 |
| Epoxy type | 89° | 50 |
| Acryl type | 83° | 45 |
| Nylon type | 76° | 35 |

*Evaluation was performed by examining presence of striae, presence of warp for the total number of substrates, and the yield of acceptable substrates is shown in %.

The contact angle in the present invention is a value measured in a room maintained at 20°±2° C. by use of a Contact-Angle Meter CA-D (produced by Kyowa Kaimen Kagaku).

EXAMPLE 10

FIGS. 8A to 8F illustrate the process showing an example of the method for preparation of the information recording medium of the present invention. All of the Figures show the cross-sections of the substrate.

The preparation process is now described consecutively by referring to the drawings.

Figure 8A:

First, in FIG. 8A, a plural number of units 1 comprising a glass plate having a groove of high precision formed according to the photolithographic steps are prepared to provide them respectively as one unit.

Figure 8B:
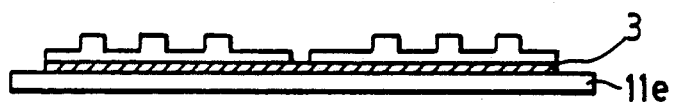

Next, in FIG. 8B, by use of the adhesive 3, the above units 1 are arranged on a member for backing as the fixing member. As the UV-ray curable type adhesive, Locktite UV-ray curable type adhesive LI-298-661 (produced by Nippon Locktite K.K.), a photocurable type adhesive Diabond DA855G, UV130 (produced by Nogawa Chemical K.K.), etc. can be used.

Also, as the fixing member 11e a glass substrate with good thickness precision and flatness can be used.

Figure 8C:
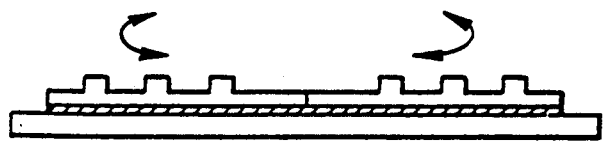
Figure 8D:
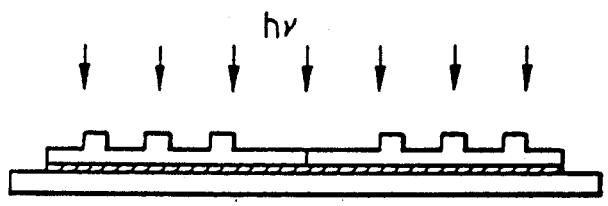

Next, as shown in FIG. 8C, after effecting registration by correcting the positions of the units, as shown in FIG. 8D, UV-ray is irradiated quickly to fix the positions of the units. At this time, UV-ray may be irradiated in either direction from the unit side or from the member side for backing, but it is required that the side to be irradiated should be made transmissive of UV-ray.

Figure 8E:
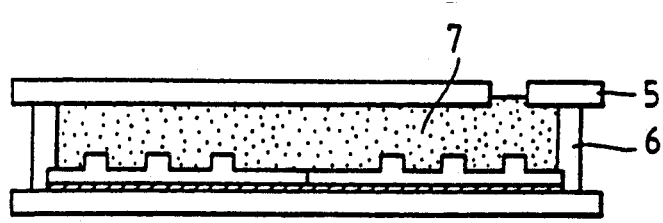

Next, as shown in FIG. 8E, the mold obtained as described above and another glass plate 5 subjected on the surface to optical polishing are arranged opposite to each other and a spacer 6 is provided therearound to assemble a cell. Into said cell is injected a liquid acryl resin having the following formulated composition as the liquid resin 7, followed by curing at 120° C. for 10 hours.

| [Formulated composition] | |
|---|---|
| Methyl methacrylate | 70 parts by weight |
| Tertiary-butyl methacrylate | 25 parts by weight |
| Polyethylene glycol dimethacrylate (MW 620) | 5 parts by weight |

Figure 8F:

Next, as shown in FIG. 8F, a substrate for information recording medium 8 is obtained by demolding from the mold.

When birefringence of the substrate for information recording medium obtained was examined, the phase contrast within a card of 54 mm in length, 86 mm in width and 0.4 mm in thickness was found to be 0.1 to 5 nm, without warping of the substrate being observed.

Also, since the uneven preformats formed on the mass 7 of the substrates for an information recording medium are each subjected to registration, recording layers could be formed before cutting into individual substrates for information recording medium, whereby productivity could be further improved.

EXAMPLE 11

FIGS. 9A to 9E illustrate the process showing an example of the method for preparation of the information recording medium of the present invention. All of the Figures show the cross-sections of the substrate.

The preparation process is now described consecutively by referring to the drawings.

Figure 9A:
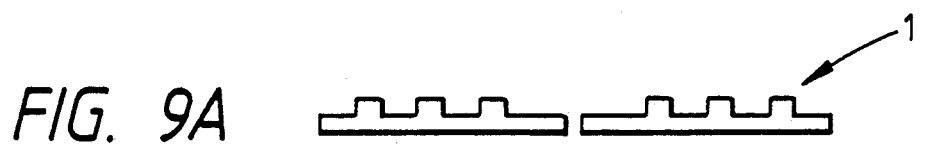

First in FIG. 9A, a plural number of units 1 comprising a glass plate having a groove of high precision formed according to the photolithographic steps are prepared to provide them respectively as one unit.

Figure 9B:
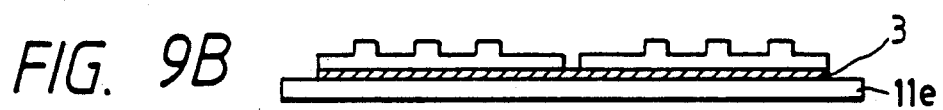

Next, in FIG. 9B, by use of the adhesive 3, the above units 1 are arranged on a member for backing as the fixing member 11e.

As the adhesive, UV-1000 which is an epoxy acrylate type adhesive produced by Sony Chemical K. K. is employed.

As the member for backing 3, a glass plate with good thickness precision and flatness is employed.

Next, after the position of the unit is corrected, UV-ray is quickly irradiated to fix the position of the unit. At this time, UV-ray may be irradiated in either direction from the unit side or from the member side for backing, but it is required that the side to be irradiated should be made transmissive of UV-ray.

Figure 9C:
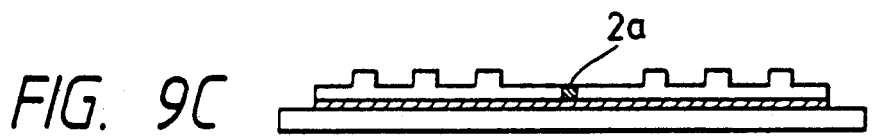

Next, as shown in FIG. 9C, a sealing material 2 is filled in the gaps of about 3 mm in width between the units. As the sealing material, an epoxy acrylate type UV-1000 was used. After filling, the sealing material is cured by irradiation of UV-ray.

Figure 9D:
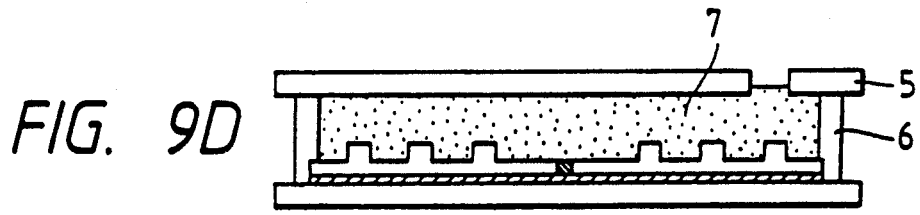

Next, as shown in FIG. 9D, the mold obtained as described above and another glass plate 5 subjected on the surface to optical polishing are arranged so opposite to each other, and a spacer 6 is provided therearound to assemble a cell.

Into said cell is injected a liquid acrylic resin having the following formulated composition as the liquid resin 7, followed by curing at 120° C. for 10 hours.

| [Formulated composition] | |
|---|---|
| Methyl methacrylate | 70 parts by weight |
| Tertiary-butyl methacrylate | 25 parts by weight |
| Polyethylene glycol dimethacrylate (MW 620) | 5 parts by weight |

Figure 9E:

Next, as shown in FIG. 9E, a substrate for information recording medium 8 is obtained by demolding from the mold.

When birefringence of the substrate for information recording medium obtained was examined, the phase contrast within a card of 54 mm in length, 86 mm in width and 0.4 mm in thickness was found to be 0.1 to 5 nm, with no warping of the substrate being observed.

EXAMPLE 12

FIGS. 9A to 9E illustrate the process showing an example of the method for preparation of the substrate for information recording medium of the present invention. All of the Figures show the cross-sections of the substrate.

The preparation process is now described consecutively by referring to the drawings.

First in FIG. 9A, a plural number of units 1 comprising a glass plate having a groove of high precision formed according to the photolithographic steps are prepared to provide them respectively as one unit.

Next, in FIG. 9B, by use of the adhesive 3, the above units are arranged on a fixing member 11e. At this time, as the adhesive, Locktite UV-ray curable type adhesive LI-298, 661, etc. are employed.

As the fixing member 11e, a glass plate with good thickness precision and flatness is employed.

Next, after the position of the unit is corrected, UV-ray is quickly irradiated to fix the position of the unit. At this time, UV-ray may be irradiated in either direction from the unit side or from the member side for backing, but it is required that the side to be irradiated should be made transmissive of UV-ray.

Next, as shown in FIG. 9C, a sealing material 2 is filled in the gaps of about 2.5 mm in width between the units. As the thermosetting resin, a bismaleimide-triazine resin (produced by Mitsubishi Gas Kagaku K.K.) was employed. After defoaming, filling and further defoaming, heating is effected at 80° C. for 6 hours, then the temperature is elevated from 80° C. to 175° C. in 2 hours, followed by heating at 175° C. for 8 hours to cure the resin.

Next, as shown in FIG. 9D, the mold obtained as described above and another glass plate 5 subjected on the surface to optical polishing are arranged so as to be opposite to each other, and a spacer 6 is provided therearound to assemble a cell.

Into said cell is injected a liquid acrylic resin having the following composition as the liquid resin 7, followed by curing at 120° C. for 10 hours.

| [Formulated composition] | |
|---|---|
| Methyl methacrylate | 70 parts by weight |
| Tertiary-butyl methacrylate | 25 parts by weight |
| Polyethylene glycol dimethacrylate (MW 620) | 5 parts by weight |

Next, as shown in FIG. 9E, the product is demolded from the mold to give a substrate for information recording medium 8.

When birefringence of the substrate for information recording medium obtained was examined, the phase contrast within a card of 54 mm in length, 86 mm in width and 0.4 mm in thickness was found to be 0.1 to 5 nm, with no warping of the substrate being observed.

EXAMPLE 13

FIGS. 9A to 9E illustrate the process showing an example of the method for preparation of the substrate for information recording medium of the present invention. All of the Figures show the cross-sections of the substrate.

The preparation process is now described consecutively by referring to the drawings.

First, in FIG. 9A, a plural number of units 1 comprising a glass plate having a groove of high precision formed according to the photolithographic steps are prepared to provide them respectively as one unit.

Next, in FIG. 9B, by use of the adhesive 3, the above units are arranged on a fixing member 11e. At this time, as the adhesive, Diabond BA855G, UV 130 of the UV-ray curable type adhesive (produced by Nogawa Chemical K.K.), etc. are employed.

As the fixing member 11, a glass plate with good thickness precision and flatness is employed.

Next, after the position of the unit is corrected, UV-ray is quickly irradiated to fix the position of the unit. At this time, UV-ray may be irradiated in either direction from the unit side or from the member side for backing, but it is required that the side to be irradiated should be made transmissive of UV-ray.

Next, as shown in FIG. 9C, a sealing material 2 is filled in the gaps of about 3.5 mm between the units. As the thermoplastic resin, Sony Bond SC608 (produced by Sony Chemical K.K.) was employed. After filling, the resin is solidified by heating at 100° C. for 180 minutes.

Next, as shown in FIG. 9D, the mold obtained as described above and another glass plate 5 subjected on the surface to optical polishing are arranged so as to be opposite to each other, and a spacer 6 is provided therearound to assemble a cell.

Into said cell is injected a liquid epoxy resin having the following formulated composition as the liquid resin 7, followed by curing at 100° C. for 10 hours.

| [Formulated composition] | |
|---|---|
| Bisphenol A type epoxy resin | 100 parts by weight |
| Methylhexahydrophthalic anhydride | 88 parts by weight |
| 2-Ethyl-4-methylimidazole | 0.5 part by weight |
| 2,6-Di-tert-butyl-p-cresol | 1.0 part by weight |

Next, as shown in FIG. 1E, the product is demolded from the mold to give a substrate for information recording medium 8.

When the birefringence of the substrate for information recording medium obtained is examined, the phase contrast within a card substrate of 54 mm in length, 86 mm in width and 0.4 mm in thickness is found to be 0.1 to 5 nm, with no warping of the substrate being observed.

EXAMPLE 14

FIGS. 9A to 9F illustrate the process showing an example of the method for preparation of the substrate for information recording medium of the present invention. All of the Figures show the cross-sections of the substrate.

The preparation process is now described consecutively by referring to the drawings.

First, in FIG. 9A, a plural number of units 1 comprising a glass plate having a groove of high precision formed according to the photolithographic steps is prepared to provide them respectively as one unit.

Next, in FIG. 9B, by use of the adhesive 3, the above units are arranged on a fixing member 11e. At this time, as the adhesive, Diabond DA855G of the UV-ray curable type adhesive (produced by Nogawa Chemical K.K.) was employed.

As the fixing member 11e, a glass plate with good thickness precision and flatness is employed.

Next, after the position of the unit is corrected, UV-ray was quickly irradiated to fix the position of the unit. At this time, UV-ray may be irradiated in either direction from the unit side or from the member side, but it is required that the side to be irradiated should be made transmissive of UV-ray.

Next, in FIG. 9C, the gaps of about 4 mm in width between the units were sealed with a sealing material 2. As the sealing material, Sony Bond UV1000 (an acrylic resin, produced by Sony Chemical) is employed. After filling, the resin is cured by irradiation of UV-ray.

On the sealing material, as shown in FIG. 9D, Frekote 44 produced by Fricoat Co., USA, is applied to a thickness of about 4 mm, followed by drying, thus applying mold release treatment, to form a mold released portion 5.

Next, as shown in FIG. 9D, the mold obtained as described above and another glass plate 5 subjected on the surface to optical polishing are arranged so as to be opposite to each other, and a spacer 6 is provided therearound to assemble a cell.

Into said cell is injected a liquid acrylic resin having the following formulated composition, followed by curing at 120° C. for 10 hours.

| [Formulated composition] | |
|---|---|
| Methyl methacrylate | 70 parts by weight |
| Tertiary-butyl methacrylate | 25 parts by weight |
| Polyethylene glycol | 5 parts by weight |

| [Formulated composition] |
| --- |
| dimethacrylate (MW 620) |

Next, as shown in FIG. 9E, the product is demolded from the mold to give a substrate for information recording medium 8. The mold releasability was good, and the connecting portion of the substrate corresponding to the portion between the units was found to be smooth without any projection.

When birefringence of the substrate for information recording medium obtained was examined, the phase contrast within a card substrate of 54 mm in length, 86 mm in width and 0.4 mm in thickness was found to be 0.1 to 5 nm, with no warping of the substrate being observed. There was no striae of the substrate due to poor releasability, neither.

EXAMPLE 15

FIGS. 11A to 11E illustrate the process showing an example of the method for preparation of the substrate for information recording medium of the present invention. All of the Figures show the cross-sections of the substrate.

The preparation process is now described consecutively by referring to the drawings.

First, in FIG. 11A, a plural number of units 1 comprising a glass plate having a groove of high precision formed according to the photolithographic steps are prepared to provide them respectively as one unit.

FIG. 2 shows a mold for casting having the above units 1 adhered to each other with an adhesive 3a. As the kind of the adhesive, one having adhesiveness to glass plate, and also having too firm adhesive force is not suitable for making exchange of units easier. In this Example, an acrylic rubber type adhesive is used, but a urethane type adhesive, a polysulfide type adhesive may be also available. Also, for exhibiting positional precision and rigidity as the mold of each unit 1, it is desirable to adhere a member 4 for backing through the same adhesive 3b as the adhesive 3a on the back of each unit 1. And, prior to curing of the adhesive 3a, a sealing member 2a for protrusion is adhered thereon to form a protruded portion. As the material for the member for protrusion 2a', a heat-resistant resin, glass or metal may be employed. This mold may be subjected to mold release treatment, if desired, to provide a mold for casting.

Next, as shown in FIG. 11C, the mold obtained as described above and another glass plate 5 subjected on the surface to optical polishing are arranged so as to be opposite to each other and a spacer 6 provided therearound to assemble a cell.

Into said cell is injected a liquid epoxy resin having the following formulated composition as the liquid resin 7, followed by curing at 100° C. for 10 hours.

| [Formulated composition] | |
| --- | --- |
| Bisphenol A type epoxy resin | 100 parts by weight |
| Methylhexahydrophthalic anhydride | 88 parts by weight |
| 2-Ethyl-4-methylimidazole | 0.5 part by weight |
| 2,6-Di-tert-butyl-p-cresol | 1.0 part by weight |

Next, after the product is demolded from the mold as shown in FIG. 11D, the substrate formed of a plural number of units was cut into predetermined sizes to obtain a substrate for information recording medium 9. (see FIG. 11E).

When the birefringence of the substrate for information recording medium obtained was examined, the phase contrast within a card substrate of 54 mm in length, 86 mm in width and 0.4 mm in thickness was found to be 0.1 to 5 nm, with no warping of the substrate being observed.

The substrate prepared as described above, on which marking is applied with the members for protrusion 2a, can utilize them as the marks for registration in the respective steps during preparation of the recording medium.

We claim:

1. A method for preparing a plurality of substrates for an information recording medium, comprising the steps of:
    preparing a mold for cast molding of the substrates for the information recording medium, with the mold having a plurality of units having uneven preformat patterns corresponding to the information recording medium formed on a surface of the units and having voids formed therebetween;
    filling the voids with a sealing material;
    pouring a liquid resin into the mold for cast molding of the substrates for the information recording medium; and
    solidifying the resin.

2. A method for preparing a plurality of substrates for an information recording medium according to claim 1, further comprising the step of forming the mold for cast molding by fixing the units onto a fixing member by use of an adhesive.

3. A method for preparing a plurality of substrates for an information recording medium according to claim 2, wherein the adhesive is a UV-ray curable adhesive.

4. A method for preparing a plurality of substrates for an information recording medium according to claim 1, further comprising the step of forming the mold for casting by positioning the plurality of units on the fixing member while a UV-ray curable adhesive is in an uncured state, and curing the adhesive to fix the units on the fixing member before the liquid resin is poured into the mold.

5. A method for preparing a plurality of substrates for an information recording medium according to claim 1, wherein the voids between the units are 10 mm or less.

6. A method for preparing a plurality of substrates for an information recording medium according to claim 5, wherein the voids between the units are 2 to 5 mm.

7. A method for preparing a plurality of substrates for an information recording medium according to claim 1, further comprising the step of applying a mold release treatment to the sealing material to promote release of the solidified resin from the mold.

8. A method for preparing a plurality of substrates for an information recording medium according to claim 1, wherein the sealing material serves as a fixing member for securing the plurality of units to each other.

9. A method for preparing a plurality of substrates for an information recording medium according to claim 1, wherein the sealing material is a bonding member for bonding the plurality of units together.

10. A method for preparing a plurality of substrates for an information recording medium according to claim 1, wherein the sealing material is not corroded by the resin for cast molding.

11. A method for preparing a plurality of substrates for an information recording medium according to claim 10, wherein the sealing material is a low melting glass.

12. A method for preparing a plurality of substrates for an information recording medium according to claim 11, wherein the difference between the thermal expansion ratio of the low melting glass and the thermal expansion ratio of the units is $30 \times 10^{-7}$ mm/(mm° C.) or less.

13. A method for preparing a plurality of substrates for an information recording medium according to claim 12, wherein the difference between the thermal expansion ratio of the low melting glass and the thermal expansion ratio of the units is $20 \times 10^{-7}$ mm/(mm° C.) or less.

14. A method for preparing a plurality of substrates for an information recording medium according to claim 10, wherein the sealing material is a low melting metal.

15. A method for preparing a plurality of substrates for an information recording medium according to claim 14, wherein the melting point of the low melting metal is 300° C. or lower.

16. A method for preparing a plurality of substrates for an information recording medium according to claim 10, wherein the sealing material is a resin.

17. A method for preparing a plurality of substrates for an information recording medium according to claim 16, wherein the resin is a thermosetting resin.

18. A method for preparing a plurality of substrates for an information recording medium according to claim 17, wherein the resin is an adhesive for adhering the plurality of units together.

19. A method for preparing a plurality of substrates for an information recording medium according to claim 18, wherein the adhesive is an epoxy acrylate adhesive.

20. A method for preparing a plurality of substrates for an information recording medium according to claim 16, wherein the resin has a Young's modulus of 2 to 300 kg/cm$^2$.

21. A method for preparing a plurality of substrates for an information recording medium according to claim 20, wherein the resin has a Young's modulus of 2 to 80 kg/cm$^2$.

22. A method for preparing a plurality of substrates for an information recording medium according to claim 1, wherein the sealing material is a material having a contact angle as measured with water of 100° or more.

23. A method for preparing a plurality of substrates for an information recording medium according to claim 1, wherein the sealing material protrudes from the surface of the units.

24. A method for preparing a substrate sheet having a plurality of uneven preformat patterns for information recording mediums, comprising the steps of:
preparing a mold for cast molding of the substrates for the information recording mediums, with the mold having a plurality of units having uneven preformat patterns corresponding to the information recording mediums formed on a surface of the units and having voids formed therein;
filling the voids with a sealing material;
pouring a liquid resin into a mold for cast molding of the substrate sheet for the information recording mediums; and
solidifying the resin.

* * * * *

UNITED STATES PATENT AND TRADEMARK OFFICE
CERTIFICATE OF CORRECTION

PATENT NO. : 5,174,937  
DATED : December 29, 1992  
INVENTOR(S) : Tomoyuki Tamura, et al.

Page 1 of 2

It is certified that error appears in the above-indentified patent and that said Letters Patent is hereby corrected as shown below:

Title page, item

[30] FOREIGN APPLICATION PRIORITY DATA:

Insert: --Dec. 28, 1987 [JP] 62-329672  
Dec. 28, 1987 [JP] 62-329673  
Dec. 28, 1987 [JP] 62-329674  
Dec. 28, 1987 [JP] 62-329675  
Dec. 28, 1987 [JP] 62-329676--.

COLUMN 6:

Line 35, "cas-" should read --cast- --.

COLUMN 8:

Line 13, "11C" should read --11c--.

COLUMN 17:

Line 18, "releasability, neither." should read --releasability.--.

UNITED STATES PATENT AND TRADEMARK OFFICE
CERTIFICATE OF CORRECTION

PATENT NO. : 5,174,937

DATED : December 29, 1992

INVENTOR(S) : Tomoyuki Tamura, et al.

It is certified that error appears in the above-indentified patent and that said Letters Patent is hereby corrected as shown below:

COLUMN 18:

Line 10, "2a," should read --2a',--.

Signed and Sealed this

Third Day of January, 1995

Attest:

Attesting Officer

BRUCE LEHMAN

Commissioner of Patents and Trademarks